(12) United States Patent
Mitchell et al.

(10) Patent No.: US 8,939,451 B2
(45) Date of Patent: Jan. 27, 2015

(54) FLOATING HIGH VACUUM SEAL CARTRIDGE

(71) Applicant: Varian Semiconductor Equipment Associates, Inc., Gloucester, MA (US)

(72) Inventors: Robert J. Mitchell, Winchester, MA (US); Elaina Noelle Babayan, Gloucester, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 150 days.

(21) Appl. No.: 13/793,862

(22) Filed: Mar. 11, 2013

(65) Prior Publication Data

US 2014/0252720 A1  Sep. 11, 2014

(51) Int. Cl.
*F16J 15/40* (2006.01)
*F16J 15/44* (2006.01)

(52) U.S. Cl.
CPC .................................. *F16J 15/441* (2013.01)
USPC ........................................................ 277/431

(58) Field of Classification Search
USPC ................... 277/409, 411, 413, 422
See application file for complete search history.

(56) References Cited

U.S. PATENT DOCUMENTS

| | | | |
|---|---|---|---|
| 7,134,668 B2 * | 11/2006 | Shinozaki | 277/431 |
| 2002/0139307 A1 | 10/2002 | Ryding et al. | |
| 2002/0180159 A1 * | 12/2002 | Nakamura et al. | 277/500 |
| 2003/0075871 A1 * | 4/2003 | Shinozaki | 277/431 |
| 2006/0102285 A1 | 5/2006 | Bluck et al. | |
| 2006/0147136 A1 | 7/2006 | Hertel et al. | |
| 2009/0243222 A1 * | 10/2009 | Pisseloup | 277/422 |
| 2009/0274548 A1 * | 11/2009 | Joco et al. | 415/112 |
| 2011/0032505 A1 | 2/2011 | Lansbergen et al. | |

FOREIGN PATENT DOCUMENTS

KR  20080013426 A  2/2008

OTHER PUBLICATIONS

International Search Report and Written Opinion Mailed Jul. 17, 2014 for PCT/US2014/022414 Filed Mar. 10, 2014.

* cited by examiner

*Primary Examiner* — Gilbert Lee

(57) ABSTRACT

An apparatus that uses a combination of mechanical contact bearings and air bearings is disclosed. The apparatus includes a fixed seal housing, attached to a process chamber and a floating seal cartridge, which is disposed in proximity to the fixed seal housing. A shaft is disposed with an aperture in the process chamber, the central opening in the fixed seal housing and the second central opening in the floating seal cartridge. A first air bearing is created between the shaft and the floating seal cartridge in the second central opening. A second air bearing is created between the floating seal cartridge and the fixed seal housing. In this way, the floating seal cartridge is free to move with the shaft radially, while still maintaining a seal between the process chamber and the external environment.

14 Claims, 8 Drawing Sheets

FLOATING HIGH VACUUM SEAL CARTRIDGE

Embodiments of the present invention relate to methods and apparatus for allowing motion to mechanisms and payloads within a vacuum chamber.

BACKGROUND

Semiconductor workpieces are processed within process chambers. Many times, these process chambers are maintained at a pressure different, typically lower, than standard atmospheric pressure. In some embodiments, the pressure within a process chamber may be considered vacuum conditions, wherein the pressure in the chamber may be between $10^{-3}$ and $10^{-7}$ Torr. Maintaining this pressure requires adequate seals on all orifices and openings in the process chamber.

In addition, there are often payloads or mechanisms within the process chamber that are required to move. This movement may be accomplished using a shaft, actuated outside the process chamber, which penetrates at least one of the walls of the process chamber. FIG. 1 shows a typical embodiment, where the shaft 110 may enter the process chamber 100 through an opening in one of the walls 101. This shaft 110 may be able to move linearly in one direction, as shown by arrows 111, thereby changing the position of its payload 150 within the process chamber 100. This linear movement may be created by an actuator 130. This actuator 130 may be a linear motor, a ball screw, mechanical linkages or other suitable devices. In addition, the shaft 110 may be able to rotate, as shown by arrow 112, about its center axis. This may be done by incorporating a rotary bearing and rotary actuator (not shown) between the linear actuator and the shaft 110. In some embodiments, both linear motion 111 and rotary motion 112 are performed by the shaft 110. In other embodiments, only one of these types of motion is utilized. Thus, actuator 130 may be capable of linear motion 111, rotary motion 112 or both. An air bearing 120 may be used to maintain vacuum conditions within the process chamber 100. The air bearing 120 may be constructed as an annular ring, where the cylindrical shaft 110 enters the process chamber after passing through the central opening 123 in the ring. The air bearing 120 uses a layer of pressurized air delivered to its central opening 123 to position the shaft 110 and hold it in the desired position. Pressurized air is delivered through channels 121 in the air bearing 120, which terminate in the central opening 123 where the shaft 110 is disposed. The highly pressurized air serves to hold the shaft 110 in place, preferably so that the shaft 110 remains equally spaced from the sides of the central opening 123 of the air bearing 120. Thus, the air bearing 120 serves to align and support the shaft 110 throughout its range of motion in direction 111. In other words, the radial movement of the shaft 110 is minimized by the highly pressurized air which pushes against it in the central opening 123.

Additionally, the air bearing 120 may also have vacuum channels 122. These vacuum channels 122 are in communication with a vacuum pump (not shown) and serve to evacuate the pressurized air from the space in the central opening 123 so that this pressurized air does not enter the process chamber 100. In other words, the pressurized air in the volume between the air bearing 120 and the shaft 110, when used with vacuum channels 122 in communication with a vacuum pump, act as a seal, effectively isolating the external environment from the environment within the process chamber 100 and maintaining the desired pressure differential.

This configuration is useful in that the air bearing 120 serves two distinct purposes. First, it supports the shaft 110, using a nearly friction-less interface, and maintains its position within the central opening 123. Secondly, it provides a seal between the external environment and the process chamber 100, allowing a pressure differential to exist therebetween. However, in some embodiments, the weight or load associated with the shaft 110 or payload 150 may be too great to be supported by an air bearing 120. In this case, the highly pressurized air may not have enough load capacity to keep the shaft 110 properly aligned. Thus, the maximum weight of the payload 150 and the shaft 110 may be limited by the air bearing 120.

Therefore, it would be beneficial if there were an apparatus and method to allow a shaft and payload to penetrate a process chamber that does not impose limitations on the weight of these components. Furthermore, this apparatus should advantageously also provide the same sealing ability that is achieved by current air bearing systems.

SUMMARY

An apparatus that uses a combination of mechanical contact bearings and air bearings is disclosed. The apparatus includes a fixed seal housing, attached to a process chamber and a floating seal cartridge, which is disposed in proximity to the fixed seal housing. A shaft is disposed with an aperture in the process chamber, the central opening in the fixed seal housing and the second central opening in the floating seal cartridge. A first air bearing is created between the shaft and the floating seal cartridge in the second central opening. A second air bearing is created between the floating seal cartridge and the fixed seal housing. In this way, the floating seal cartridge is free to move with the shaft radially, while still maintaining a seal between the process chamber and the external environment.

In one embodiment, the apparatus for moving a payload within a process chamber comprises a shaft passing through an aperture in a wall of the process chamber; a mechanical contact bearing to support the shaft, disposed outside the process chamber; a fixed seal housing, having a first central opening through which the shaft passes, an upper surface affixed to an outer surface of the wall, and a lower surface; a floating seal cartridge, having a second central opening through which the shaft passes, an upper surface disposed proximate to the lower surface of the fixed seal housing wherein the space therebetween defines an interface, and a lower surface, the floating seal cartridge comprising a cartridge air channel, disposed in the floating seal cartridge, in communication with a source of pressurized air and terminating at the second central opening; and one or more cartridge vacuum channels, disposed in the floating seal cartridge, and terminating at the second central opening, wherein a first air bearing is created between the floating seal cartridge and the fixed seal housing at the interface and a second air bearing is created between the floating seal cartridge and the shaft at the second central opening.

In another embodiment, a method of allowing a shaft to penetrate an aperture in a process chamber while maintaining a pressure differential between the process chamber and the exterior environment, is disclosed. This method comprises disposing a fixed seal housing against the process chamber, the fixed seal housing comprising a first central opening aligned with the aperture; disposing a floating seal cartridge beneath the fixed seal housing, where the space between the fixed seal housing and the floating seal cartridge defines an interface, wherein the floating seal cartridge comprises a second central opening; disposing the shaft through the second central opening, the first central opening and the aperture; and creating a first air bearing between the floating seal cartridge and the shaft in the second central opening and a second air bearing between the floating seal cartridge and the fixed seal housing at the interface.

In another embodiment, an apparatus for moving a payload within a process chamber comprises a shaft passing through an aperture in a wall of the process chamber; a mechanical contact bearing to support the shaft, disposed outside the process chamber; a fixed seal housing, having a first central opening through which the shaft passes, an upper surface affixed to an outer surface of the wall, and a lower surface, the fixed seal housing comprising a housing pressurized air port for connection to a source of pressurized air; a housing differential vacuum pumping port for connection to a pump; one or more housing air channels in communication with the housing pressurized air port and terminating at the lower surface to deliver pressurized air; and one or more housing vacuum channels in communication with the housing differential vacuum pumping port and terminating at the lower surface to evacuate pressurized air; a floating seal cartridge, having a second central opening through which the shaft passes, an upper surface disposed proximate to the lower surface of the fixed seal housing wherein the space therebetween defines an interface, and a lower surface, the floating seal cartridge comprising one or more cartridge air channels, disposed in the floating seal cartridge, connecting the upper surface of the floating seal cartridge to the second central opening, such that pressurized air from the interface is supplied to the second central opening; and one or more cartridge vacuum channels, disposed in the floating seal cartridge, connecting the interface and the second central opening, wherein pressurized air is evacuated from the second central opening and delivered to the interface; wherein a first air bearing is created between the floating seal cartridge and the fixed seal housing at the interface and a second air bearing is created between the floating seal cartridge and the shaft at the second central opening.

BRIEF DESCRIPTION OF THE FIGURES

For a better understanding of the present disclosure, reference is made to the accompanying drawings, which are incorporated herein by reference and in which.

DETAILED DESCRIPTION

Figure 1:
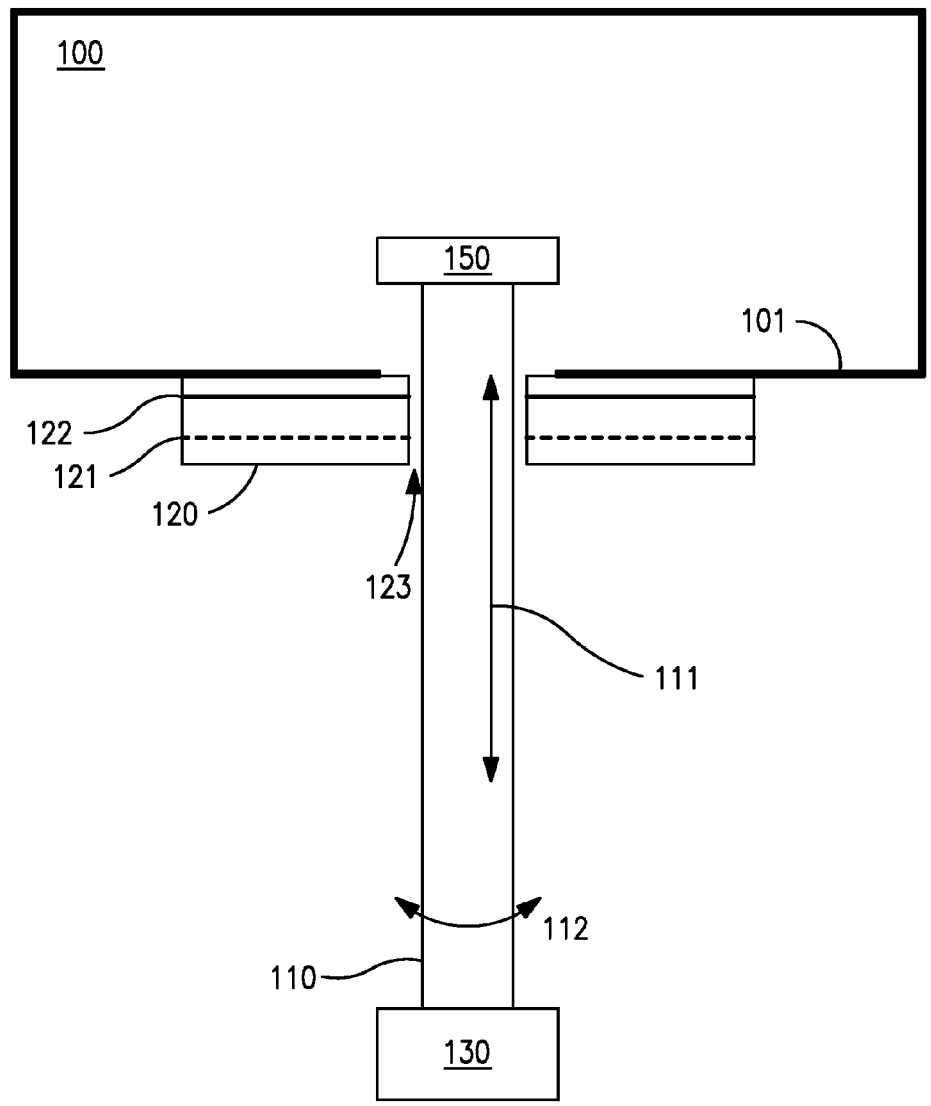
FIG. 1 shows an air bearing of the prior art.

As described above, air bearings may be effective devices to support loads and create seals. However, air bearings may be ineffective in supporting very heavy loads, as the layer of pressurized air does not have the requisite force capacity to hold the load in place. Therefore, as payloads and shafts become heavier, it is likely that traditional air bearings, such as that as shown in FIG. 1, may become ineffective.

Figure 2:
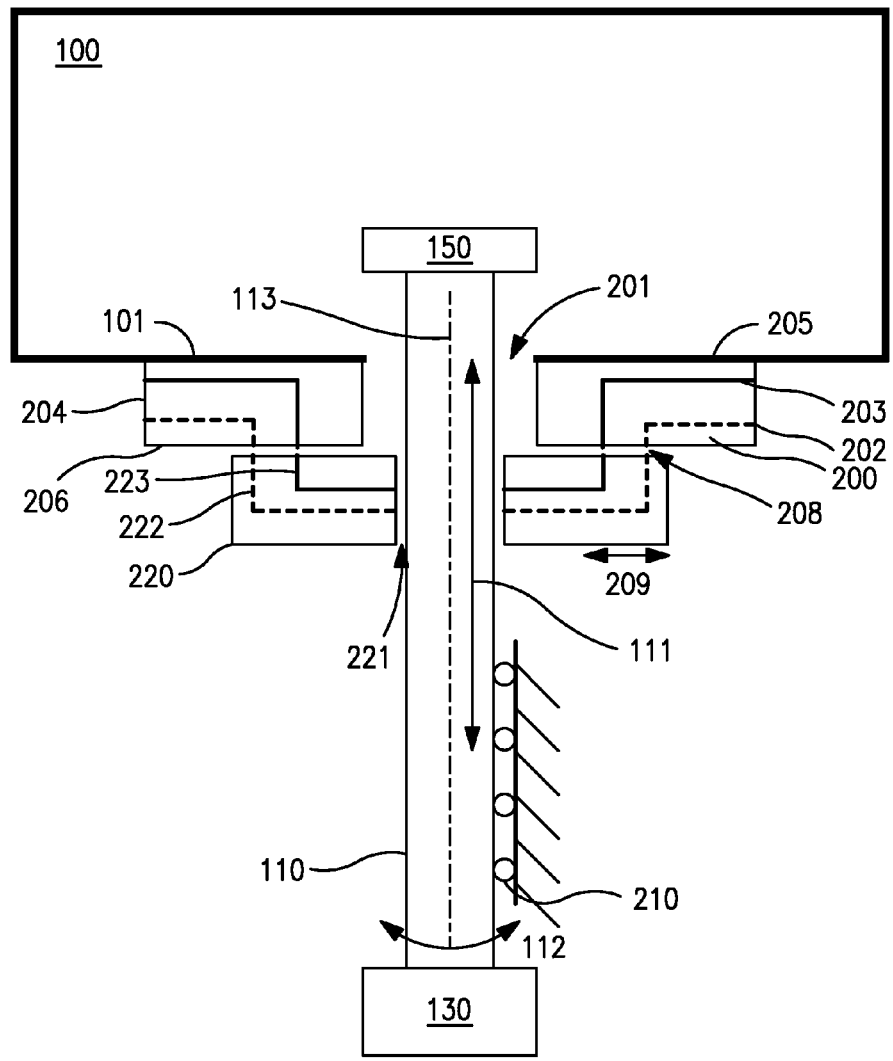
FIG. 2 shows a system according to one embodiment.

FIG. 2 shows a first embodiment of a floating seal cartridge 200. In this embodiment, as before, a shaft 110 penetrates an aperture in a wall 101 of a process chamber 100 and may be axially driven by an actuator 130 to allow movement along direction 111. As described above, rotational movement along direction 112 may also be possible through the use of a rotary bearing and a rotary actuator. Thus, actuator 130 may be capable of linear motion 111, rotary motion 112 or both. However, unlike the embodiment of FIG. 1, a mechanical contact bearing 210, which may be a linear bearing, a rotary bearing, or a combination of a rotary bearing and a linear bearing, is used to support the shaft 110 and any associated payload 150. The rotary bearing may be any suitable type, such as a ball bearing, cross roller bearing or other type of rotary bearing. The rotary bearings may be made of bearing grade steel but can be fabricated from ceramics as well. In the case of a linear bearing, the mechanical contact bearing 210 may be any suitable device, such as ball bearings, recirculating linear ball or roller bearings or other high load mechanical bearings. Traditional mechanical contact bearings can be designed to support far more weight than air bearings, making them preferable in this embodiment. However, mechanical contact bearings lack the dimensional precision needed to support the use of a differentially pumped non-contact seal. In other words, the shaft 110 will deviate from its center axis 113 as it moves along direction 111. In other words, the mechanical contact bearing 210 allows axial motion, but also may cause or permit radial movement due to the inherent imprecision of the mechanical parts. Because of this radial movement, a mechanical contact bearing 210, when used by itself, may be ineffective in maintaining isolation and pressure differential between the external environment and that within the process chamber 100.

An upper surface 205 of a fixed seal housing 200 is affixed to an outer surface of a wall 101 of the process chamber 100. The fixed seal housing 200 may be made from aluminum or stainless steel with a bearing liner. The bearing liner is provided in case of contact that occurs when the seal is not pressurized. This bearing liner may be made from graphite, bronze or other suitable air bearing liner materials. The wall 101 may have an aperture in it, such as a round hole, which the shaft 110 passes through. The fixed seal housing 200 may be constructed as an annular ring, having a first central opening 201 dimensioned sufficiently large so that, accounting for the radial movement of the shaft 110, the cylindrical shaft 110 does not contact the fixed seal housing 200 during its travel in direction 111. In other embodiments, the fixed seal housing 200 may have another shape, with a central opening 201 disposed therein. The aperture in wall 101 and the first central opening 201 may be concentric, as shown in FIG. 2. However, because of the size of the gap between the shaft 110 and the inner wall of the fixed seal housing 200, it may not be possible to create a seal using differential vacuum pumping in the first central opening 201.

A floating seal cartridge 220 is also employed in this embodiment, where, like the fixed seal housing 200, the floating seal cartridge 220 may also be an annular ring. In other embodiments, the floating seal cartridge 220 may be a different shape, having a central opening. Like the fixed seal housing 200, the floating seal cartridge 220 may be made from stainless steel or aluminum. Bearing surfaces may include a bearing liner, constructed of graphite or other suitable air bearing liner materials. However, as described in more detail below, the size of its central opening, also referred to as the second central opening 221, is smaller than the central opening 201 of the fixed seal housing 200. This second central opening 221 has a diameter slightly larger than that of the cylindrical shaft 110. In some embodiments, the radial gap between the shaft 110 and the second central opening 221 is on the order of 10 microns.

Housing air channels 202 are disposed in the fixed seal housing 200. These housing air channels 202 terminate in one or more housing pressurized air ports disposed on the outer edge 204 of the fixed seal housing 200. This housing pressurized air port is in communication with a pressurized air source (not shown). The housing air channels 202 deliver pressurized air from a pressurized air source to the lower surface 206 of the fixed seal housing 200. The space between the lower surface 206 of the fixed seal housing 200 and the upper surface of the floating seal cartridge 220 defines an interface 208. While FIG. 2 shows the housing air channel 202 as containing two perpendicular parts, the housing air channel 202 may be disposed in any number of ways, which are not limited by this disclosure. This pressurized air creates a nearly friction-less surface at this interface 208, allowing the floating seal cartridge 220 to move in radial direction 209 relative to the fixed seal housing 200.

Figure 6:
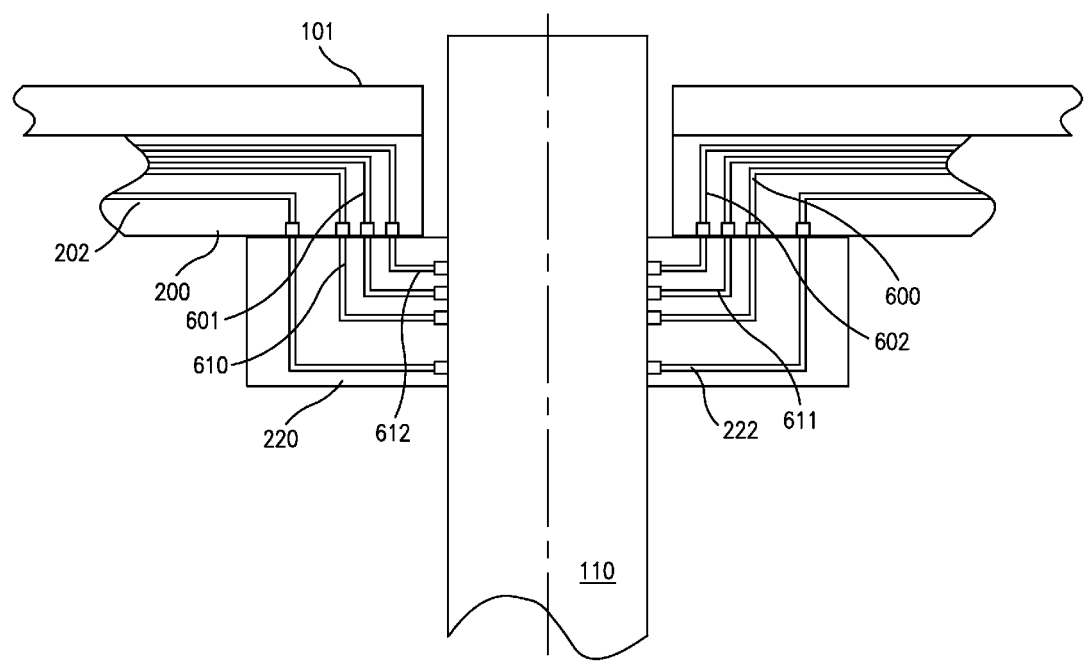
FIG. 6 shows an expanded view of FIG. 2, showing the air channels and vacuum channels.

Additionally, the fixed seal housing 200 may also have one or more housing vacuum channels 203 disposed therethrough, in communication with one or more housing differential vacuum pumping ports located on the outer edge 204 of the fixed sealing housing 200. These housing vacuum channels 203 may disposed throughout the fixed seal housing 200 in any pattern. This housing differential vacuum pumping port may be in communication with a pump, such as a vacuum pump (not shown). The distal ends of the housing vacuum channels 203 terminate at the upper surface of the floating seal cartridge 220. The housing vacuum channels 203, in combination with the vacuum pump, serve to evacuate the pressurized air from the interface 208 so that this pressurized air does not enter the process chamber 100. In other words, the layer of pressurized air in the interface 208 between the fixed seal housing 200 and the floating seal cartridge 220, when used with housing vacuum channels 203 and a vacuum pump, acts as a seal, isolating the external environment from the environment within the process chamber 100 and maintaining the desired pressure differential between these environments. FIG. 6 shows one particular embodiment including various vacuum ports 600-602, each with a different vacuum pressure. These various vacuum ports 600-602 are collectively referred to as the housing vacuum channels 203 throughout this disclosure. As described above, pressurized air is pumped into the interface 208 through housing air channels 202. This housing air channel 202 is disposed furthest from the shaft 110. Adjacent to the housing air channel 202, and disposed closer to the shaft 110 are multiple housing vacuum channels 600-602. Vacuum channel 600, is disposed adjacent to the housing air channel 202 and serves as a vent port which vents the pressurized air to atmosphere. Adjacent to the vent port 600 and closer to the shaft 110 is a rough vacuum port 601, which is connected to a vacuum pump. This rough vacuum port 601 may be used to reduce the pressure to within 1 and 100 milliTorr, or to other pressures required by the design of the system. Adjacent to the rough vacuum port 601 and closer to the shaft 110 is a high vacuum port 602, which is connected to a second vacuum pump and reduces the pressure to the sub-milliTorr range. This configuration of vacuum ports 600-602 may be used in any embodiment described herein where a differentially pumped non-contact seal is desired.

The near vacuum conditions created by the housing vacuum channels 203 near the interface 208 may also draw the floating seal cartridge 220 toward the fixed seal housing 200, thereby holding the floating seal cartridge 220 in place while maintaining the required gap space in interface 208.

As shown in FIG. 2, cartridge air channels 222 are embedded in floating seal cartridge 220. These cartridge air channels 222 pass from the upper surface of the floating seal cartridge 220 near the interface 208 through the floating seal cartridge 220 and terminate at second central opening 221. Again, although these cartridge air channels 222 are shown as two perpendicular paths, other patterns are possible. Pressurized air, which originates from the pressurized air source, passes through housing air channel 202 in fixed seal housing 200, and is delivered to the interface 208. It is then carried through cartridge air channels 222 in floating seal cartridge 220 and delivered to the second central opening 221. Thus, the pressurized air source creates pressurized air at both the interface 208 and the second central opening 221. Similarly, cartridge vacuum channels 223 are disposed in the floating seal cartridge 220, with one set of openings disposed at the upper surface of the floating seal cartridge 220 near the interface 208 and the distal set of openings terminating at the second central opening 221. As described above, these cartridge vacuum channels 223 may be disposed in any pattern in the floating seal cartridge 220. These cartridge vacuum channels 223 serve to maintain the seal between the exterior environment and the process chamber 110 by evacuating pressurized air from the second central opening 221 and delivering it to the interface 208. FIG. 6 shows an embodiment where three vacuum ports 610-612 are in communication with vacuum ports 600-602 at the interface 208. These vacuum ports 610-612 function in the same manner of vacuum ports 600-602, respectively, as described above. Thus, the combination of a layer of pressurized air at interface 208 and a second layer of pressurized air at second central opening 221 allows a seal to be created between the external environment and the process chamber 100, thereby maintaining the desired pressure differential.

Figure 3:
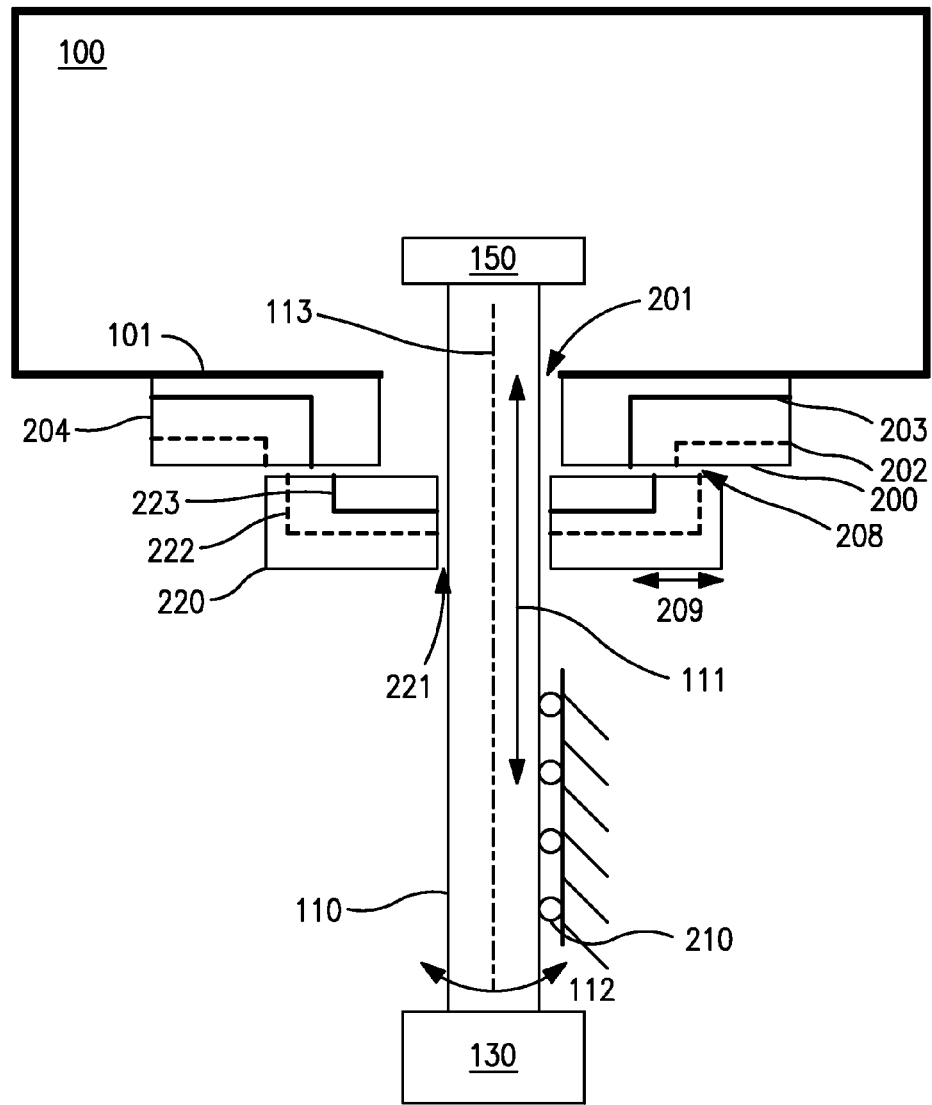
FIG. 3 shows the system of FIG. 2, where the shaft has moved radially.

Furthermore, pressurized air in second central opening 221 allows the floating seal cartridge 220 to remain aligned with the shaft 110, even during radial movement. Since interface 208 is nearly friction-less, the floating seal cartridge 220 may move radially to maintain its fixed relationship with the shaft 110. FIG. 3 shows, in an exaggerated view, a shaft 110 that has moved radially with respect to the fixed seal housing 200 and the process chamber 100. In response, the floating seal cartridge 220 has moved radially with the shaft 110, so that the shaft 110 remains concentric with the second central opening 221. Note that the shaft 110 is no longer concentric with the aperture in the process chamber 100, or with the first central opening 201 in fixed seal housing 200. However, the movement of floating seal cartridge 220 allows the process chamber 100 to remain isolated from the exterior environment by maintaining seals at the second central opening 221 and at the interface 208.

Thus, unlike the embodiment of FIG. 1, the embodiment of FIGS. 2 and 3 allows the shaft 110 to determine the positioning of the floating seal cartridge 220. In FIG. 1, it was the air bearing 120 that determined the position of the shaft 110. Because of this modification in operation, the limiting factor for load capacity is defined by mechanical contact bearing 210, and not by air bearings. In this embodiment and those described below, two air bearings are created, one in the space between the shaft 110 and the floating seal cartridge 220 in the second central opening 221 and a second between the fixed seal housing 200 and the floating seal cartridge 220 at the interface 208. Each of these air bearing provides a differentially pumped non-contact seal.

Figure 4:
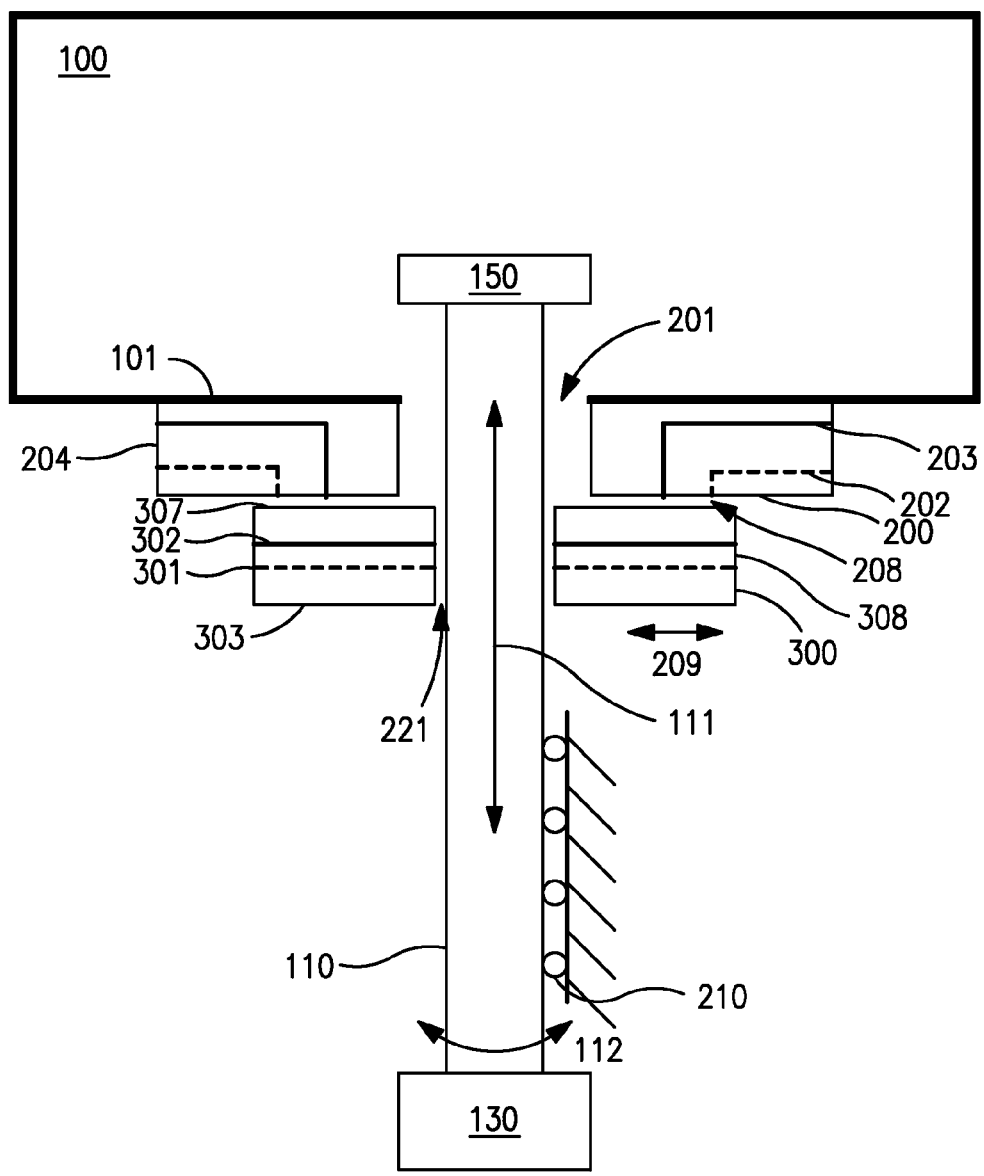
FIG. 4 shows the system according to another embodiment.

The embodiments of FIGS. 2, 3 and 6 assume that the layer of pressurized air supplied to the interface 208 can also be used to pressurize the second central opening 221. FIG. 4 shows another embodiment, where the cartridge air channels 301 are directly in communication with a source of pressurized air (not shown) via a cartridge pressurized air port disposed on an outer surface of the floating seal cartridge 300. All components that remain unchanged from the previous embodiments have been given the same reference designators and will not be described again. As in the previous embodiment, the floating seal cartridge 300 may be an annular ring having an inner opening, or second central opening 221, dimensioned such that the circular shaft 110 may pass therethrough. In this embodiment, a source of pressurized air (not shown) may be in communication with the cartridge pressurized air port disposed on the outer edge 308 of the floating seal cartridge 300. This cartridge pressurized air port is in communication with the cartridge air channels 301, which may travel from the outer edge 308 of the floating seal cartridge 300, through the floating seal cartridge 300 to the second central opening 221. In this way, the pressurized air supplied to interface 208 is completely independent of the pressurized air supplied to the second central opening 221.

As was described earlier, cartridge vacuum channels 302 may also be included to insure that the pressurized air in second central opening 221 does not reach the process chamber 100. These cartridge vacuum channels 302 may be in communication with one or more vacuum pumps via a cartridge differential vacuum pumping port disposed on the outer edge 308 of the floating seal cartridge 300. In some embodiments, the cartridge vacuum channels 302 comprise three vacuum ports, such as those described in connection with FIG. 6. In this scenario, the high vacuum port would be located closest to the process chamber 100, with the vent port located furthest from the process chamber 100, adjacent to cartridge air channel 301. These cartridge vacuum channels 302 serve to evacuate pressurized air from the second central opening 221 and deliver it to the cartridge differential vacuum pumping port along the outer edge 308.

In a variation of this embodiment, the source of pressurized air may be connected to a cartridge pressurized air port disposed on the lower surface 303 of the floating seal cartridge 300. Similarly, the vacuum pump may connect to the floating seal cartridge 300 via a cartridge differential vacuum pumping port on the lower surface 303. In fact, the cartridge differential vacuum pumping port and the cartridge pressurized air port may be disposed on any exposed exterior surface of the floating seal cartridge 300. In some embodiments, the exposed exterior surfaces include the outer edge 308 and the lower surface 303 of the floating seal cartridge 300.

Figure 7:
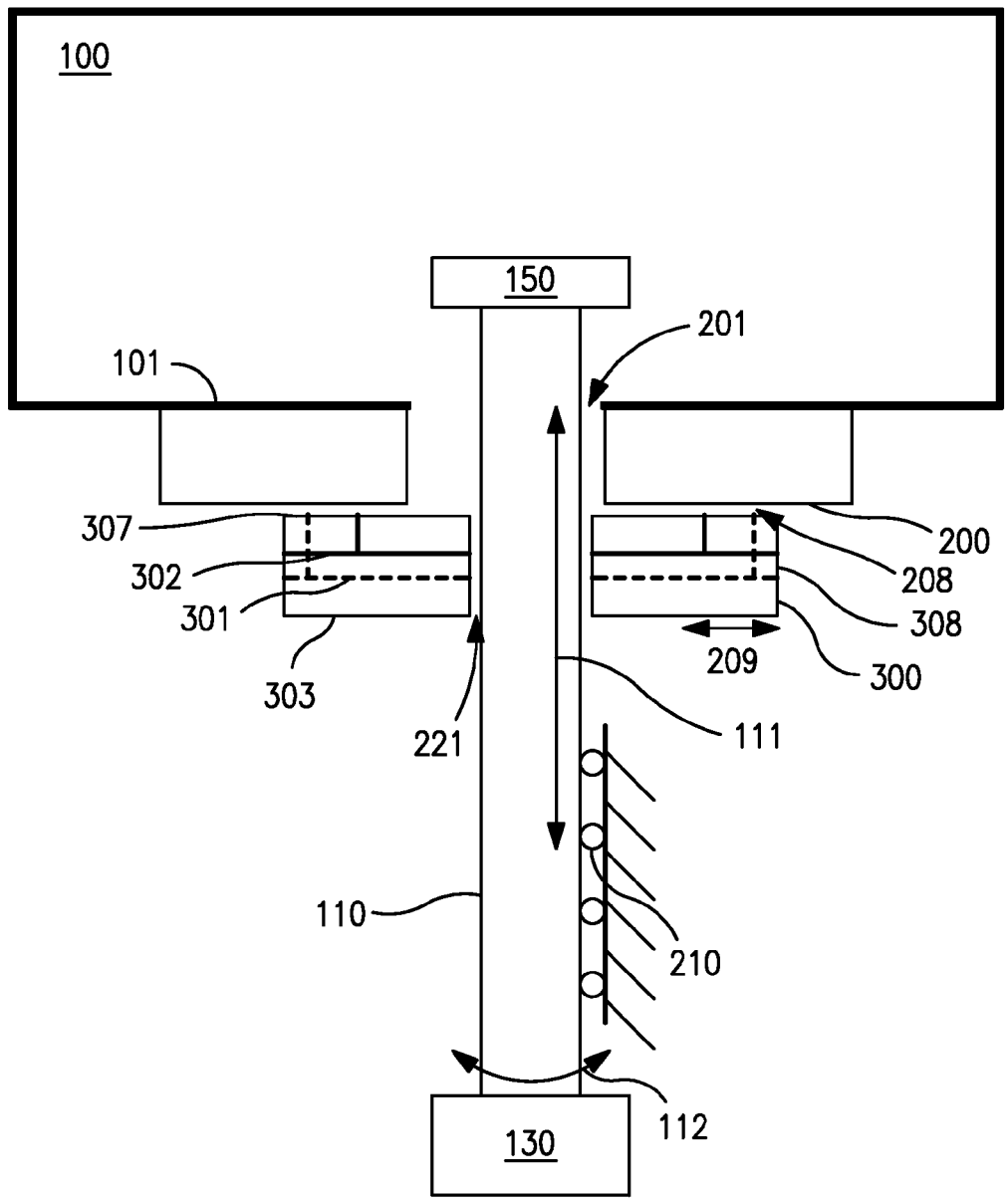
FIG. 7 shows the system according to another embodiment.

FIG. 7 shows another embodiment, where the source of pressurized air and the vacuum pumps (not shown) are connected to an outer edge 308 of the floating seal cartridge 300. However, in this embodiment, cartridge air channels 301 disposed in the floating seal cartridge supply pressurized air to both the interface 208 and to the second central opening 221. Similarly, the vacuum pump evacuates air from both the interface 208 and the second central opening 221 and delivers it to a cartridge differential vacuum pumping port disposed on the outer edge 308 of the floating seal cartridge 300 through cartridge vacuum channels 302. Therefore, in this embodiment, there are no housing air channels or housing vacuum channels disposed in the fixed seal housing 200. While FIG. 7 shows a cartridge air channel 301 having a T-connection, other configurations are possible. For example, separate sets of ports may be disposed on the floating seal cartridge 220, where one set of ports services the interface 208 and a second set of ports services the second central opening 221. Additionally, as described above, the cartridge pressurized air port and the cartridge differential vacuum pumping ports may be along any exposed surface, including the outer edge 308 and the lower surface 303.

In these embodiments, like that of FIG. 2, two air bearings are created, one in the space between the shaft 110 and the floating seal cartridge 220 in the second central opening 221 and a second between the fixed seal housing 200 and the floating seal cartridge 220 at the interface 208. Each of these air bearing provides a differentially pumped non-contact seal.

Figure 5:
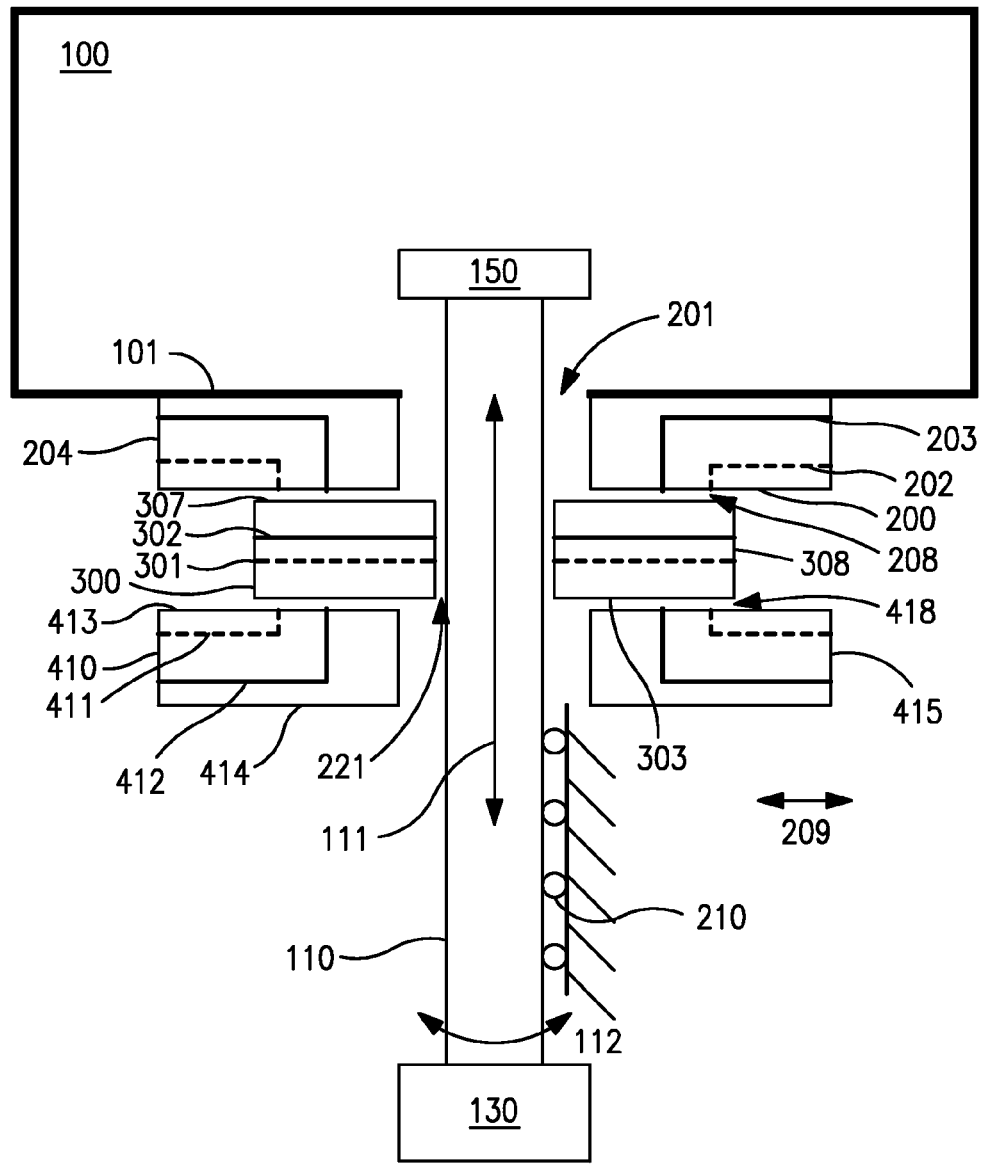
FIG. 5 shows the system according to another embodiment.

The embodiments of FIGS. 2-4 and 7 assume that the negative pressure generated by the vacuum channels 203, 302 in interface 208 provides sufficient vacuum force in order to allow the floating seal cartridge 220, 300 to remain in position, separated by the fixed seal housing 200 by pressurized air in the interface 208. In other embodiments, it may be necessary to support the floating seal cartridge 300 on both its upper surface 307 and its lower surface 303. FIG. 5 shows an embodiment where the floating seal cartridge 300 is supported on its upper surface 307 by fixed seal housing 200 and on its lower surface 303 by a second fixed surface 410. The second fixed surface may also be an annular ring, or may be another shape having a central opening through which the shaft 110 passes. As described above in connection with FIG. 4, floating sealing cartridge 300 has cartridge air channels 301 for delivering pressurized air from a source (not shown) to the second central opening 221. Similarly, cartridge vacuum channels 302 are used to draw air away from the second central opening 221 to maintain the vacuum conditions within process chamber 100.

In this embodiment, the second fixed surface 410 may also have second surface air channels 411 which may be used to create an air bearing along second interface 418. The second surface air channels 411 are in communication with a second surface pressurized port disposed on the outer edge 415 of the second fixed surface 410. This second surface pressurized air port is in communication with a source of pressurized air (not shown). The second surface air channels 411 are disposed within the second fixed surface 410 and terminate at the upper surface 413 which creates the second interface 418 between the second fixed surface 410 and the floating seal cartridge 300. As before, second surface vacuum channels 412 may also be included to evacuate air from the second interface 418 and deliver it to a second surface differential vacuum pumping port disposed on the outer edge 415 of the second fixed surface 410. In this embodiment, a nearly friction-less surface is created on the upper surface 303 and the lower surface 307 of floating seal cartridge 300, allowing it to move radially in direction 209 as the shaft 110 moves. The use of air bearings in second central opening 221 and in interface 208 also serves to isolate the process chamber 100 from the external environment. Thus a seal between the central opening of the second fixed surface 410 and the shaft 110 may not be required.

In this embodiment, as was true in the embodiment of FIG. 4, the source of pressurized air may be connected to a second surface port disposed on an exposed exterior surface of second fixed surface 410, such as the outer edge 415 or the lower surface 414 of the second fixed surface 410. Similarly, the vacuum pump may connect to the second fixed surface 410 via a second surface differential vacuum pumping port on any exposed surface, such as the outer edge 415 or the lower surface 414. In this embodiment, three air bearings are created, one in the space between the shaft 110 and the floating seal cartridge 220 in the second central opening 221, a second between the fixed seal housing 200 and the floating seal cartridge 220 at the interface 208 and a third between the floating seal cartridge 220 and the second fixed surface 410 at the second interface 418. At least the first and second of these air bearings provide a differentially pumped non-contact seal.

Figure 8:
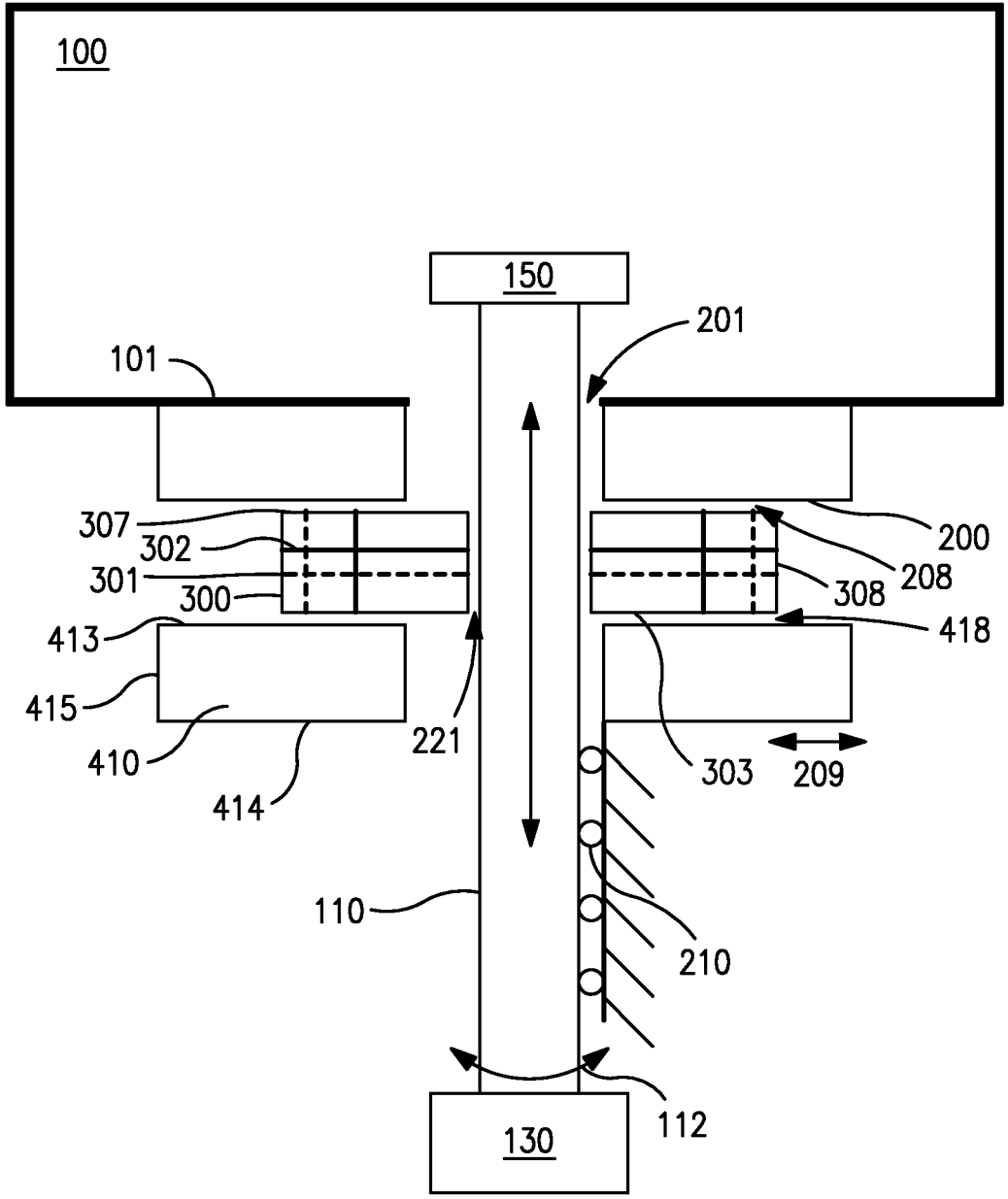
FIG. 8 shows the system according to another embodiment.

FIG. 8 is a variation of the embodiment of FIG. 5. In this embodiment, floating sealing cartridge 300 has cartridge air channels 301 for delivering pressurized air from a source (not shown) disposed on the outer edge 308 to the second central opening 221. Additionally, pressurized air from the source is delivered to interface 208 and second interface 418. Similarly, cartridge vacuum channels 302 are used to draw air away from the second central opening 221, the interface 208 and the second interface 418 and deliver it to a cartridge differential vacuum pumping port disposed on the outer edge 308 of the floating seal cartridge 300. This may be achieved through a set of cartridge air channels and a set of cartridge vacuum channels each in communication with a pressurized air source and vacuum pump, respectively and servicing the three destinations. In another embodiment, separate sets of ports may be disposed on the floating seal cartridge 300, each associated with a different interface or opening. In this embodiment, there are no housing air channels or housing vacuum channels in the fixed seal housing 200. Additionally, there are no second surface air channels 411 or second surface vacuum channels 412 in the second fixed surface 410.

This disclosure refers to upper surfaces and lower surfaces. This convention is used to correspond with the orientations shown in FIGS. 1-8. However, the disclosure is not limited to this embodiment and the shaft 110 does not need to enter from the bottom of the process chamber 100. In fact, it may enter through any wall 101 in the chamber. In these embodiments, the term "upper surface" is used to denote that surface closest to the process chamber, while the term "lower surface" denotes the surface furthest from the process chamber.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus for moving a payload within a process chamber, comprising:
    a shaft passing through an aperture in a wall of the process chamber;
    a mechanical contact bearing to support the shaft, disposed outside the process chamber;
    a fixed seal housing, having a first central opening through which the shaft passes, an upper surface affixed to an outer surface of the wall, and a lower surface;
    a floating seal cartridge, having a second central opening through which the shaft passes, an upper surface disposed proximate to the lower surface of the fixed seal housing wherein the space therebetween defines an interface, and a lower surface, the floating seal cartridge comprising
        a cartridge air channel, disposed in the floating seal cartridge, in communication with a source of pressurized air and terminating at the second central opening; and
        one or more cartridge vacuum channels, disposed in the floating seal cartridge, and terminating at the second central opening,
    wherein a first air bearing is created between the floating seal cartridge and the fixed seal housing at the interface and a second air bearing is created between the floating seal cartridge and the shaft at the second central opening.

2. The apparatus of claim 1, wherein the fixed seal housing comprises:
    a housing pressurized air port for connection to a source of pressurized air;
    a housing differential vacuum pumping port for connection to a pump;
    a housing air channel in communication with the pressurized air port and terminating at the lower surface to deliver pressurized air; and
    one or more housing vacuum channels in communication with the housing differential vacuum pumping port and terminating at the lower surface to evacuate pressurized air from the interface.

3. The apparatus of claim 2, wherein the cartridge air channel is in communication with the upper surface of the floating seal cartridge to deliver pressurized air from the interface to the second central opening; and the cartridge vacuum channels evacuate pressurized air from the second central opening and deliver the pressurized air to the interface.

4. The apparatus of claim 2, wherein the floating seal cartridge comprises:
    one or more cartridge pressurized air ports disposed on an outer surface for connection to a source of pressurized air, where the cartridge air channel is in communication with the cartridge pressurized air ports; and
    one or more cartridge differential vacuum pumping ports disposed on an outer surface for connection to a pump, where the cartridge vacuum channels deliver pressurized air from the second central opening to the cartridge differential vacuum pumping ports.

5. The apparatus of claim 1, wherein the floating seal cartridge comprises:
    one or more cartridge pressurized air ports disposed on an outer surface for connection to a source of pressurized air;
    one or more cartridge differential vacuum pumping ports disposed on an outer surface for connection to a pump;
    wherein the cartridge air channel is in communication with the cartridge pressurized air port;
    a second cartridge air channel is in communication with the cartridge pressurized air ports and the upper surface to deliver pressurized air; and
    wherein the cartridge vacuum channels are in communication with the second central opening, the upper surface and the cartridge differential vacuum pumping ports to evacuate pressurized air.

6. The apparatus of claim 1, further comprising a second fixed surface, having an upper surface and a central opening through which the shaft passes, disposed such that the upper surface is proximate to the lower surface of the floating seal cartridge, the gap therebetween defining a second interface, wherein an air bearing is created in the second interface.

7. The apparatus of claim 1, wherein the first air bearing and the second air bearing each comprise differentially pumped non-contact seals.

8. The apparatus of claim 7, wherein the cartridge vacuum channels comprise a vent port, a rough vacuum port and a high vacuum port.

9. A method of allowing a shaft to penetrate an aperture in a process chamber while maintaining a pressure differential between the process chamber and the exterior environment comprising:
- disposing a fixed seal housing against the process chamber, the fixed seal housing comprising a first central opening aligned with the aperture;
- disposing a floating seal cartridge beneath the fixed seal housing, where the space between the fixed seal housing and the floating seal cartridge defines an interface, wherein the floating seal cartridge comprises a second central opening;
- disposing the shaft through the second central opening, the first central opening and the aperture; and
- creating a first air bearing between the floating seal cartridge and the shaft in the second central opening and a second air bearing between the floating seal cartridge and the fixed seal housing at the interface.

10. The method of claim 9, wherein the first air bearing and the second air bearing comprise differentially pumped non-contact seals.

11. An apparatus for moving a payload within a process chamber, comprising:
- a shaft passing through an aperture in a wall of the process chamber;
- a mechanical contact bearing to support the shaft, disposed outside the process chamber;
- a fixed seal housing, having a first central opening through which the shaft passes, an upper surface affixed to an outer surface of the wall, and a lower surface, the fixed seal housing comprising
  - a housing pressurized air port for connection to a source of pressurized air;
  - a housing differential vacuum pumping port for connection to a pump;
  - one or more housing air channels in communication with the housing pressurized air port and terminating at the lower surface to deliver pressurized air; and
  - one or more housing vacuum channels in communication with the housing differential vacuum pumping port and terminating at the lower surface to evacuate pressurized air;
- a floating seal cartridge, having a second central opening through which the shaft passes, an upper surface disposed proximate to the lower surface of the fixed seal housing wherein the space therebetween defines an interface, and a lower surface, the floating seal cartridge comprising
  - one or more cartridge air channels, disposed in the floating seal cartridge, connecting the upper surface of the floating seal cartridge to the second central opening, such that pressurized air from the interface is supplied to the second central opening; and
  - one or more cartridge vacuum channels, disposed in the floating seal cartridge, connecting the interface and the second central opening, wherein pressurized air is evacuated from the second central opening and delivered to the interface;
- wherein a first air bearing is created between the floating seal cartridge and the fixed seal housing at the interface and a second air bearing is created between the floating seal cartridge and the shaft at the second central opening.

12. The apparatus of claim 11, wherein the first air bearing and the second air bearing each comprise differentially pumped non-contact seals.

13. The apparatus of claim 12, wherein the housing vacuum channels and the cartridge vacuum channels comprise a vent port, a rough vacuum port and a high vacuum port.

14. The apparatus of claim 11, further comprising a second fixed surface, having an upper surface and a central opening through which the shaft passes, disposed such that the upper surface is proximate to the lower surface of the floating seal cartridge, the gap therebetween defining a second interface, wherein an air bearing is created in the second interface.

* * * * *